UNITED STATES PATENT OFFICE.

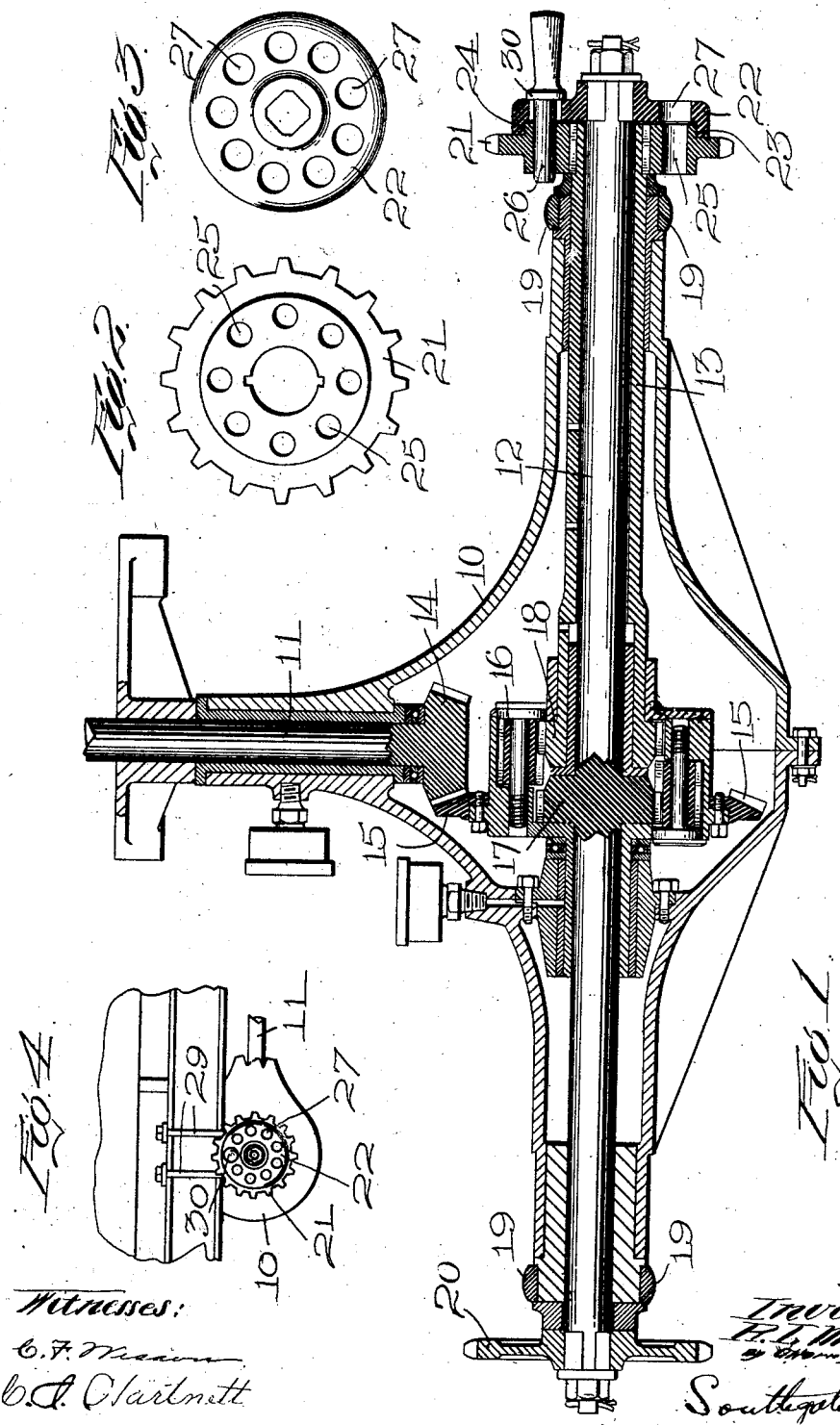

RALPH L. MORGAN, OF WORCESTER, MASSACHUSETTS.

TRANSMISSION MECHANISM.

1,009,435.  Specification of Letters Patent.  Patented Nov. 21, 1911.

Application filed February 26, 1910. Serial No. 546,245.

*To all whom it may concern:*

Be it known that I, RALPH L. MORGAN, a citizen of the United States, residing at Worcester, in the county of Worcester and State of Massachusetts, have invented a new and useful Transmission Mechanism, of which the following is a specification.

This invention relates to driving mechanism for automobile trucks and similar vehicles.

The principal objects of the invention are to provide an efficient construction in connection with any ordinary form of differential gearing for driving the jack shaft and sleeve, whereby the two sprocket wheels or other transmitting devices can be made to operate positively in unison when desired, and to provide such a means of a simple, durable and convenient construction without materially increasing the cost of the transmission and without introducing any complications into the ordinary operation of the device.

Further objects and advantages of the invention will appear hereinafter.

Reference is to be had to the accompanying drawings in which—

Figure 1 is a central horizontal sectional view of a portion of the driving mechanism of an automobile truck or the like constructed in accordance with this invention. Fig. 2 is an elevation of one of the sprocket wheels, Fig. 3 is a similar elevation of the locking wheel therefor and Fig. 4 is an end elevation of the casing.

As ordinarily constructed automobile transmission mechanisms are provided with differential gearing adapted to drive the jack shaft and the sleeve thereon at the same speed under ordinary conditions, but capable of permitting one to rotate faster than the other as is necessary in turning corners. On this account the two sprocket wheels or their driving devices which are connected with the jack shaft and sleeve, respectively, are not positively connected and consequently, at times when one wheel is in a hole or meets some other obstruction, that wheel will be retarded and the other wheel cannot positively and efficiently assist it in getting over the obstruction. This invention is designed to overcome this difficulty in a very simple and efficient manner by the employment of removable means adapted to be carried by the operator or on the machine, so constructed that it can be applied in case of a difficulty of this kind to positively connect the shaft and sleeve or the two sprocket wheels so that both of them will be caused positively to rotate together, whereby they both act with full efficiency to move the obstructed wheel over the obstacle.

Referring to the drawings, a form of transmission mechanism is illustrated in which the casing 10 (preferably of bronze) contains driving shaft 11, jack shaft 12 and sleeve or quill 13 concentric with the jack shaft. The driving shaft is shown as having an integral driving bevel pinion 14 meshing with a bevel gear 15 which through the differential gears 16 drives a gear 17 integral with the jack shaft and a gear 18 integral with the sleeve. On account of these integral constructions, keys are dispensed with. This differential provides, as has been stated, for permitting either jack shaft or sleeve to rotate faster than the other when the vehicle is turning a corner or the like. The outboard supports of the counter shaft casing are carried in large ball and socket joints 19 supported by U-bolts 29 from the frame.

On one end of the jack shaft is fixed a driving member 20 shown as a sprocket wheel. On the opposite end of the sleeve is fixed a corresponding driving member or sprocket wheel 21. The jack shaft extends through the sleeve and projects from the end thereof and on this projecting end is fixedly mounted a locking wheel 22. This locking wheel is shown as flanged over at 23 so as to engage a projecting shoulder 24 on the sprocket wheel and protect the bearing surface between them from the entrance of dirt.

The sprocket wheel is provided with a plurality of perforations or sockets 25 into which fits a removable locking pin 26. The locking wheel is shown as provided with a number of perforations 27 through which the pin can pass. Obviously when the pin extends through one of the perforations 27 into one of the perforations 25, the two wheels 21 and 22 will be locked positively together so that all the power transmitted through the differential will be applied equally to the two wheels and either one will assist the other in passing over an obstruction. In order that it may be easy at all times to insert the pin 26 through the holes in the two wheels, it is preferred to make the number of holes in one of them larger than the number in the other. For instance, in the construction illustrated there are eight holes 25 in the sprocket wheel and nine holes 27 in the locking wheel. In addition to this the pin is made to fit frictionally tight in the holes 25 and the holes 27 are made considerably larger so that whatever the relative positions of these two wheels there will be found two holes somewhere around the circumference which almost or exactly coincide so that the pin can be inserted. The pin is shown as provided with a collar or flange 30 larger than the holes 27 for an obvious purpose.

It will be seen that the above described advantages are secured in a most simple and inexpensive way by the construction described and that the locking pin which is the only part that does not have to be carried by the driving mechanism can be carried about by the operator very easily.

While I have illustrated and described a preferred embodiment of the invention, I am aware that many modifications can be made therein by any person skilled in the art without departing from the scope of the invention as expressed in the claims. Therefore I do not wish to be limited to all the details shown and described, but What I do claim is:—

1. In a transmission mechanism, the combination of a driving shaft, differential gearing connected therewith, a jack shaft and a concentric sleeve driven by the differential gearing, power transmitting devices longitudinally and laterally fixed on the jack shaft and sleeve respectively, and removable means for positively locking the power transmitting devices together.

2. In a transmission mechanism the combination of two rotary power transmitting wheels, a wheel fixed longitudinally and laterally with respect to one of the power transmitting wheels, and removable means for fixing the same to the other power transmitting wheel.

3. In a device of the character described, the combination of two rotary members one located within the other, a power transmitting wheel on each of said rotary members one of said wheels having a socket therein, a locking device fixed on the other rotary member, and means for locking said device to the wheel having the socket.

4. In a transmission mechanism, the combination of a shaft, and concentric sleeve, means for simultaneously driving the shaft and sleeve, power transmitting devices on the shaft and sleeve respectively, a locking wheel fixed to the shaft and provided with perforations, and a pin adapted to project through one of the perforations, the power transmitting device on the sleeve having a perforation for receiving the pin.

5. In a device of the character described, the combination of a shaft, a sleeve rotatable thereon, a sprocket wheel fixed to one end of the shaft, a sprocket wheel fixed to the other end of the sleeve, said shaft extending through the sleeve beyond the last named sprocket wheel, a locking wheel fixed to the projecting end of the shaft and provided with a perforation, the sprocket wheel on the sleeve having a plurality of perforations at the same distance from the center as the perforations in the locking wheel, and a pin adapted to project through the perforation in the locking wheel into one of the projections in the sprocket wheel.

6. In a device of the character described, the combination of two independently rotatable members, two power transmitting wheels one on one of said members, a locking wheel fixed on the other of said members, each of said wheels having a plurality of perforations at the same distance from the axis of the shaft, the perforations in one wheel being greater in number than those in the other, and a pin adapted to project through one wheel into the other and fitting frictionally in the perforations therein.

In testimony whereof I have hereunto set my hand, in the presence of two subscribing witnesses.

RALPH L. MORGAN.

Witnesses:
 LOUIS W. SOUTHGATE,
 ALBERT E. FAY.